(12) United States Patent
Finkelstein

(10) Patent No.: US 11,711,298 B2
(45) Date of Patent: Jul. 25, 2023

(54) MULTI-MAC CONTROLLER AND SINGLE PHY SYSTEMS AND METHODS

(71) Applicant: Cox Communications, Inc., Atlanta, GA (US)

(72) Inventor: Jeff Finkelstein, Atlanta, GA (US)

(73) Assignee: Cox Communications, Inc., Atlanta, GA (US)

( * ) Notice: Subject to any disclaimer, the term of this patent is extended or adjusted under 35 U.S.C. 154(b) by 0 days.

(21) Appl. No.: 17/076,580

(22) Filed: Oct. 21, 2020

(65) Prior Publication Data

US 2022/0124029 A1  Apr. 21, 2022

(51) Int. Cl.
| | | |
|---|---|---|
| *H04L 12/723* | (2013.01) |
| *H04L 12/28* | (2006.01) |
| *H04L 12/46* | (2006.01) |
| *H04L 29/08* | (2006.01) |
| *H04L 45/50* | (2022.01) |
| *H04L 69/321* | (2022.01) |
| *H04L 69/323* | (2022.01) |

(52) U.S. Cl.
CPC .......... *H04L 45/50* (2013.01); *H04L 12/2801* (2013.01); *H04L 12/4641* (2013.01); *H04L 69/321* (2013.01); *H04L 69/323* (2013.01)

(58) Field of Classification Search
CPC . H04L 45/50; H04L 12/2801; H04L 12/4641; H04L 69/321; H04L 69/323
See application file for complete search history.

(56) References Cited

U.S. PATENT DOCUMENTS

| | | | | |
|---|---|---|---|---|
| 6,775,290 | B1 * | 8/2004 | Merchant | H04L 49/354 |
| | | | | 370/395.31 |
| 8,068,516 | B1 * | 11/2011 | Oz | H04L 9/12 |
| | | | | 725/111 |
| 9,699,102 | B2 * | 7/2017 | Cloonan | H04L 49/90 |
| 2004/0120326 | A1 * | 6/2004 | Yoon | H04L 12/467 |
| | | | | 370/400 |
| 2004/0228277 | A1 * | 11/2004 | Williams | H04L 47/2433 |
| | | | | 370/468 |
| 2015/0046966 | A1 * | 2/2015 | Sheng | H04N 21/25 |
| | | | | 725/116 |
| 2020/0145710 | A1 * | 5/2020 | Poli | H04N 21/2665 |
| 2020/0280370 | A1 * | 9/2020 | Frozenfar | H04B 10/25751 |

* cited by examiner

*Primary Examiner* — Derrick V Rose
(74) *Attorney, Agent, or Firm* — Eversheds Sutherland (US) LLP

(57) ABSTRACT

The present disclosure relates to multi-MAC controllers and single PHY systems and methods. An example method may include receiving, at a remote PHY device and from a first MAC device located at a headend of a network, a first data packet, including a first identifier. The example method may also include determining, by the remote PHY device and using the first identifier included in the first data packet, a first output of the PHY device onto which to transmit the first data packet, the first output including a first group of customer devices. The example method may also include receiving, at the remote PHY device and from a second MAC device located at the headend, a second data packet, including a second identifier. The example method may also include determining, by the remote PHY device and using the second identifier included in the second data packet, a second output of the PHY device onto which to transmit the second data packet, the second output including a second group of customer devices.

11 Claims, 6 Drawing Sheets

US 11,711,298 B2

MULTI-MAC CONTROLLER AND SINGLE PHY SYSTEMS AND METHODS

TECHNICAL FIELD

The disclosure generally relates to networks that may include multiple media access control (MAC) controllers providing data to a single physical (PHY) device. In some embodiments, the disclosure may be implemented in Data Over Cable Service Interface Specification (DOCSIS) networks, but may similarly be applied in other types of networks as well.

BACKGROUND

Networks (for example, DOCSIS networks) may often include a MAC device located in an upstream portion of a network (for example, in a DOCSIS network, the MAC device may be located more proximate to a headend of the network). The MAC device may provide packet scheduling (among other) capabilities in the MAC domain (for example, the MAC layer or layer-2 in the Open Systems Interconnection (OSI) stack), and may provide data to a remote PHY (for example, the physical layer or layer-1 in the OSI stack) layer device located downstream on the network. The remote PHY layer device may then provide the data to one or more customer premises devices (CPEs). In some cases, the data may be provided to the CPEs through one or more taps (termination devices). In such network configurations, however, individual data outputs (which may be referred to as "legs," "output legs," "outputs," or the like herein) from the PHY device may be treated as one single MAC domain, such that all of the customer devices associated with the particular PHY device may be scheduling packet transmissions against one another. Additionally, all of the customer devices in the single MAC domain may see the same downstream packet transmissions.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
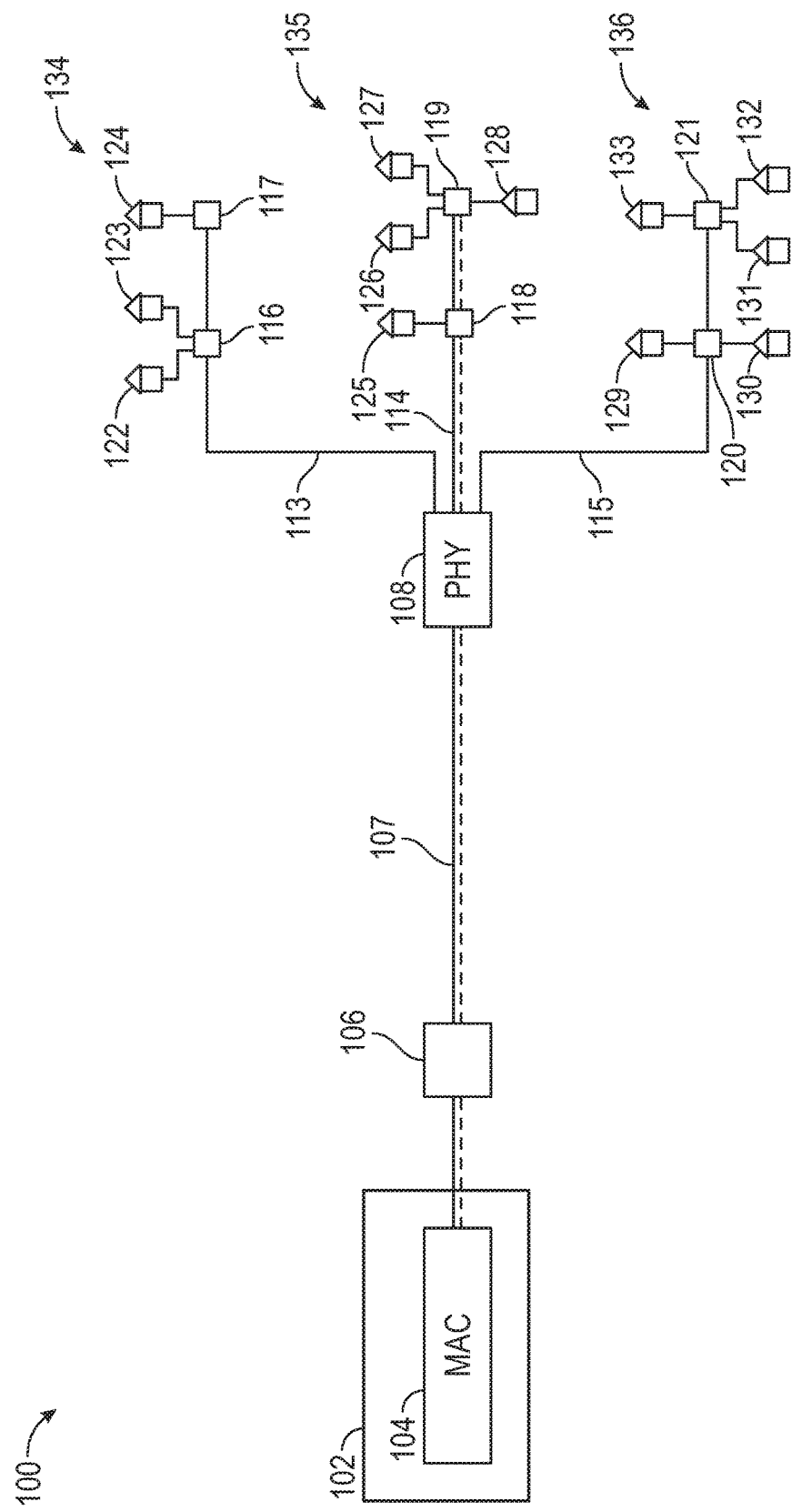
FIG. 1 depicts an example network architecture, in accordance with one or more example embodiments of the disclosure.

The disclosure is directed to, among other things, multi-MAC controller and single PHY systems and methods. More particularly, the systems and methods described herein may provide a network configuration that may employ multiple MAC controllers at an upstream portion of the network (for example, at a headend of the network) and a remote PHY device (the terms "PHY device" and "remote PHY device" may be used interchangeably herein to refer to a physical layer device that may receive data packets from a MAC controller) that may feed one or more customer premises equipment (CPEs) at a downstream portion of the network. For example, a single remote PHY device may be associated with multiple MAC controllers at the headend that may provide data packets to the single remote PHY device. The multi-MAC controller and single PHY systems may allow for the CPEs associated with the PHY device to be split into multiple distinct scheduling groups, with the individual scheduling groups receiving data packets originating from an associated individual MAC controller at the headend. For example, instead of scheduling data packets associated with all of the CPEs associated with a PHY device against one another, the CPEs may be separated into distinct scheduling groups, with each scheduling group being associated with one of the MAC controllers at the headend. The benefits of such a network configuration may include at least a reduction in the complexity of the tasks required to be performed by a scheduler (for example, the MAC controllers or any other device in the network), the use of smaller scheduling groups that may result in less scheduling conflicts as less devices are scheduling data packet transmissions against one another, and a more secure network as smaller groups of CPEs are being exposed to the same downstream data.

In some embodiments, the multi-MAC controller and single PHY systems described herein may include at least a cable modem termination system (CMTS), a PHY device downstream from the CMTS, and one or more CPEs that may be associated with the PHY device. In some cases, the CPEs may be connected to the PHY device through one or more taps (for example, termination devices). More particularly, the CMTS may be located at a headend of the network and may include multiple MAC controllers. In some cases, the CMTS may be a virtual CMTS with multiple virtual MAC controllers, but may also be a physical CMTS with physical MAC controllers as well. For example, the CMTS may include a first MAC controller and a second MAC controller. Both the first MAC controller and the second MAC controller may be in communication with a remote PHY device. In some cases, the PHY device may be located externally to the CMTS and proximate to the CPEs. However, the PHY device may also be located anywhere else on the network as well. In some cases, the first MAC controller and second MAC controller may be connected to the remote PHY device through a fiber connection (however, the connection may include any other type of transmission cable as well, such as coaxial, for example). Additionally, the first MAC controller and second MAC controller may be associated with their own individual logical data streams (which may be referred to as "tunnels" herein) to the PHY device. For example, the tunnels may not necessarily refer to physically distinct transmission cables, but may instead refer to separations between data packets based on unique tags included within the data packets. For example, the tunnels may be created using 802.1Q tunneling methods through the use of VLAN tags that may be applied to varying data packets to indicate which "tunnel" the data packets are associated with. In this example, a first data packet can be provided with a first VLAN ID tag, a second data packet can be provided with a second VLAN ID tag, and a third data packet can be provided with a third VLAN ID tag. Continuing this example, the first data packet and second data packet may be associated with a first tunnel based on the first VLAN ID tag and the third data packet may be associated with a second tunnel based on the second VLAN ID tag. It should be noted that the use of VLAN ID tags is just one example of producing distinct data "tunnels" through the network, and any other method may similarly be used. The individual tunnels from the first MAC controller and second MAC controller may respectively serve a first scheduling group, including a first set of CPEs connected to the remote PHY device, and a second scheduling group including a second set of CPEs connected to the remote PHY device. For example, instead of the network including one MAC controller with one tunnel feeding the PHY device, and the PHY device feeding a single scheduling group including all of the CPEs in communication with the PHY device, the network described herein may be capable of separating the CPEs into multiple scheduling groups by using multiple MAC controllers with multiple tunnels to feed subsets of the CPEs in communication with the remote PHY device. As one example, if a PHY device is serving 300 CPEs, with a single MAC controller, all 300 CPEs may be scheduling packet transmissions against one another. However, with multiple MAC controllers using multiple tunnels to feed two subsets, including 150 CPEs each, only 150 CPEs may be scheduling packet transmissions against one another. Additional details regarding example network configuration of the multi-MAC controller and single PHY system described herein as well as more detailed descriptions of individual components included within the network may be described below with respect to FIG. 2.

In some embodiments, the scheduling performed by the MAC controllers in maintaining discrete data transfer tunnels may be performed using virtual local area networks (VLANs). A VLAN may include a grouping of one or more devices that may be configured to communicate as if they were located on the same physical local area network (LAN), when they may in fact, be located on any number of LANs in distinct geographic locations. For example, VLANs may be groupings of devices that may not necessarily be grouped together in a single geographical location. Each VLAN may provide data link access to all hosts connected to switch ports configured with the same VLAN ID. The VLAN tag may be a 12-bit field in the Ethernet header that may provide support for over 4,000 VLANs per switching domain. VLAN tagging is standardized in IEEE (Institute of Electrical and Electronics Engineers) 802.1Q and may be referred to as Dot1Q. This VLAN tagging may be performed by the one or more MAC devices in order to separate traffic associated with different MAC controllers. For example, a MAC controller may receive an untagged packet that is to be transmitted to the remote PHY device. Before sending the packet to the remote PHY device, the MAC controller may add a VLAN ID tag to the header of the packet using the 802.1Q format. The packet, including the VLAN ID tag, may then be transmitted to the remote PHY device. It should be noted that while VLANs may be consistently described herein as being used to separate traffic from individual MAC controllers, any other methods may similarly be employed, such as, for example, virtual private networks (VPNs), multiprotocol label switching (MPLS), and/or label-switched paths (LSPs), among other methods.

In some embodiments, the remote PHY device may receive the transmitted packet through an individual tunnel associated with a given MAC controller. The remote PHY device may then extract the information included within the header of the packet to identify the VLAN ID tag added to the packet by the MAC controller. Based on this VLAN ID tag, the remote PHY device may be able to determine an associated output leg of the PHY device on which to transmit the packet. That is, the PHY device may be able to determine which scheduling group of CPEs that should receive the data packet from the PHY device. The data packet may then be transmitted onto the appropriate output leg of the PHY device, to an associated tap device, and then finally to the appropriate CPE at a customer's premises. In this regard, the discrete network tunnels associated with individual MAC controllers and their associated scheduling groups may be maintained even as the data packet is passed through the PHY device and beyond into the individual scheduling groups because the PHY device may route the data packets to their corresponding scheduling groups using the VLAN ID tag added by the MAC controller. In this regard, a data packet sent by a first MAC controller may remain within a first tunnel through its entire downstream journey to a first CPE for which it is intended, and a data packet sent by a second MAC controller may remain within a second tunnel through its entire downstream journey to a second CPE for which it is intended. Thus, as described above, in some cases, the data packet information for the first CPE may not be visible to the second CPE, and vice versa, which may provide enhanced security to packet transmissions along the network. Additionally, as mentioned above, the first data packet and second data packet may be scheduled individually the first MAC controller, first CPE, second MAC controller, and second CPE may not need to compete for resources and attempt to schedule the first data packet and second data packet against one another along a single tunnel through the network.

In some cases, the PHY device may determine which output leg to provide a data packet to using a look-up table. The look-up table may be a table that includes a listing of VLAN ID tags and the legs of the PHY device that different VLAN ID tags are associated with. For example, the look-up table may indicate that a first VLAN ID tag is associated with a first leg, and a second VLAN ID tag is associated with a second leg. Using this information, the PHY device may then be able to determine which leg to transmit the data packet on based on the particular VLAN ID tag added to the data packet header by the MAC controller. In other words, the look-up table may allow the PHY device to determine which "tunnel" a data packet is being transmitted over to maintain the tunnel through the PHY device and all the way to the CPE at the customer's premises. The look-up table may be stored locally to the PHY device, or may be stored remotely from the PHY device, and the PHY device may either directly access the look-up table at the remote location, or may request information on the look-up table from the remote location.

Turning to the figures, FIG. 1 depicts an example network 100 architecture, in accordance with one or more example embodiments of the disclosure. In particular, the network 100 depicted in FIG. 1 may include may include a single MAC controller 104. The MAC controller may be located within a headend 102, for example, but may similarly be located in any other part of the network 100. The network 100 may separate out the functionality of a CMTS into a MAC layer device (for example, the MAC controller 104) and a PHY layer device 108, as may be described in further detail below. Networks, such as network 100, making use of remote PHY devices 108 may use at least two different methods of transmitting data packets. In a first method depicted in network 100, a hardware-based MAC layer device 104 (the terms "MAC layer device" and "MAC controller" may be used interchangeably herein) may receive incoming data packets and may transmit the data packets to a remote PHY device 108 over fiber 107 (or fiber 207 shown in FIG. 2), such as, for example, digital fiber. In some embodiment, the data packets may be transmitted to another device (for example, a customer premise equipment) using the remote PHY device 108. In particular, the data packets can be transmitted from the remote PHY device 108 on coaxial fiber (for example coaxial fiber on leg 113, leg 114, and/or leg 115 of the PHY device 108) to a customer (for example, to a customer's premise equipment (CPE), such as a cable modem). Additionally, one or more amplifiers (not shown in the figure) may be used to prevent the attenuation of the signal.

As noted, in some embodiments, networks making use of remote PHY devices 104 may use at least two different methods of transmitting data packets, the first method of which was described above. A second method to transmit data packets on the network may involve performing aspects of the above transmission in software (for example, in a cloud computing environment). In such a case, the MAC layer 102 functionality may be software-implemented (for example, in the cloud), and such functionality may be referred to as a virtual MAC (VMAC) layer 102. Accordingly, as packets are received (for example, from another device such as a headend) and processed by the VMAC 102, the data packets may then be transmitted out (for example, using Ethernet switches, hubs, routers, and the like) to the remote PHY device 108 over fiber 107 (for example, digital fiber). From the remote PHY device 108, the data packets may be transmitted over coaxial cables (for example, coaxial fiber on leg 113, leg 114, and leg 115 of the PHY device 108) to a customer using one or more amplifiers (not shown in the figure) to reduce the attenuation of the signal. For example, the data packets may be transmitted to a customer's premise equipment (CPE) (for example, CPE 122, CPE 123, and CPE 124, CPE 125, CPE 126, CPE 127, and CPE 128, CPE 129, CPE 130, CPE 131, CPE 132, and/or CPE 133, as well as any other number of CPEs), such as a cable modem. It should be noted that although reference is made herein to certain portion of the network using fiber cables and certain portions using coaxial cables, these same portions may also include any other type of transmission cable as well.

In some embodiments, a cable modem termination system (CMTS) may include devices that represent layer-1, layer-2, and/or any other layer functionality of the Open Systems Interconnection (OSI) model used in connection with cable networks. In some embodiments, devices that represent the layer-1, layer-2, and/or any other layer functionality may have a system architecture wherein all the devices are placed in one chassis, that is, in one chassis in one geographical location. In another embodiment, in a remote PHY topology (for example, the topology shown and described in connection with FIGS. 1-2), the layer-1 and/or layer-2 devices can exist in a different chassis that may be distributed throughout the network 100. In some embodiments, the various layer-1 and/or layer 2 devices in the distributed architecture described herein can communicate with one another using an Ethernet-based protocol. In another embodiment, the various devices (that is the layer-1 and/or layer-2 devices) can communicate using a downstream external PHY interface (DEPI) protocol, for example, between a layer-2 device to a layer-1 device. In another embodiment, the DEPI protocol can be used between devices that both have MAC functionality. In some embodiments, the various devices can use an upstream external PHY interface (UEPI) protocol to communicate between devices of different layer types, for example, between devices having MAC functionality.

In some embodiments, the different layer devices (for example, layer-1 and/or layer-2 devices) can communicate using a tunneling protocol and/or method, such as a layer-2 virtual private network (VPN) tunnel, a generic router encapsulation (GRE) and/or a pseudowire. In some embodiments, the pseudowire can refer to an emulation of a point-to-point connection over a network. In some embodiments, the pseudowire can be used to transport frames (for example, DOCSIS frames), over a cable network. In some embodiments, the pseudowire can use a layer two tunneling protocol (L2TP) underlying protocol. In another embodiment, the pseudowire and/or tunnel can use an internet telephony (IP) protocol, such as IPv6 and/or IPv4.

In some embodiments, the DEPI protocol, the UEPI protocol, and/or a generic control plane (GCP) protocol can control aspects of the delivery of Data Over Cable Service Interface Specification (DOCSIS) frames between devices. In some embodiments, DEPI can represent a pseudowire that can connect frames (such as DOCSIS downstream MAC frames) from device from one layer (such as a layer-2 device), to a device from a different layer (for example, a layer-1 device). In some embodiments, the devices from the different layers can be provided in separate locations. In some embodiments, the different layer devices can be connected using a common timing source. In some embodiments, the DEPI protocol, the UEPI protocol, and/or the GCP protocol used by the different layer devices (for example layer-1 and/or layer-2 devices) can be used to set up a session and tear down a session between the different layer devices.

In some embodiments, as used herein, the physical (PHY) layer may represent a fundamental layer in the OSI stack underlying the logical data structures of higher-level functions (for example, the MAC layer) in a network. For example, the PHY layer may refer to layer-1 of the OSI stack. A PHY layer device may only include layer-1 functionality, or may also include a combination of any number of functionalities of any of the layers of the OSI stack. The physical layer can define the means of transmitting raw bits rather than logical data packets over a physical link connecting network nodes. The bit stream may be grouped into code words or symbols and may be converted to a physical signal that is transmitted over a hardware transmission medium (e.g., coaxial cable). The physical layer may provide an electrical and procedural interface to the transmission medium. The physical layer may include the shapes and properties of the electrical connectors, the frequencies to broadcast on, the modulation scheme to use, and the like. In some instances, any of the PHY devices herein may only include PHY functionality and may not include any other OSI stack functionality. However, in some embodiments, the PHY devices may include other layer functionality of the OSI stack as well, such as MAC layer functionality, or any other functionality.

Figure 5:
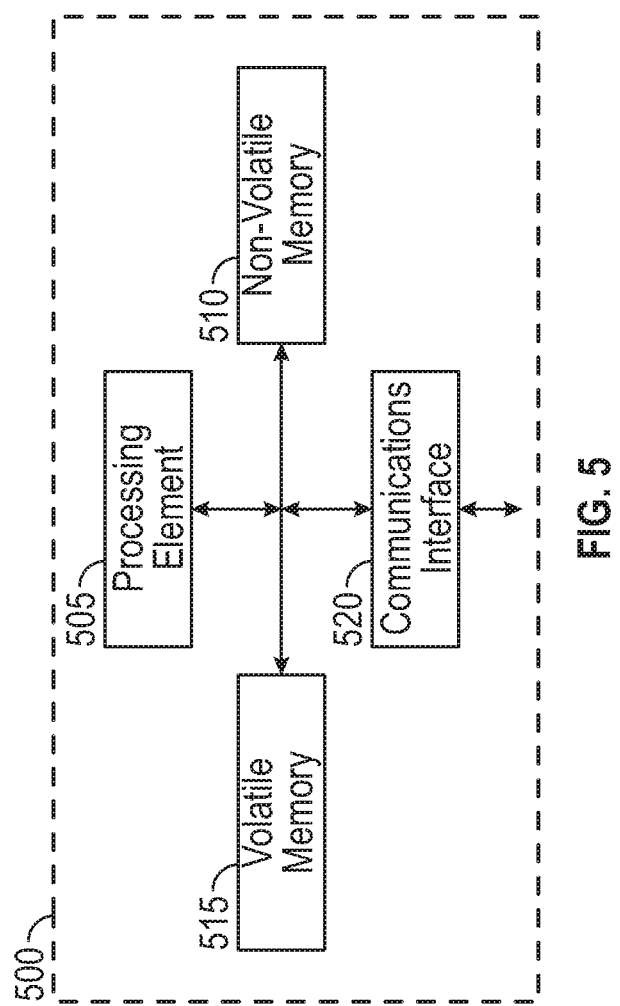
FIG. 5 depicts an example computing entity, in accordance with one or more example embodiments of the disclosure.

In some embodiments, the MAC layer may represent a fundamental layer in the OSI stack that may provide addressing and/or channel access control mechanisms that can allow several terminals or network nodes to communicate within a multiple access network that incorporates a shared medium, for example, an Ethernet, cable, telecommunications, wireless, or other type of network. For example, the MAC layer may refer to layer-2 of the OSI stack. A MAC layer device may only include layer-2 functionality, or may also include a combination of any number of functionalities of any of the layers of the OSI stack. In some embodiments, the MAC layer can act as an interface and/or intermediary layer between the application layer and the network's physical layer. In some embodiments, the MAC layer can emulate a full-duplex logical communication channel in a multipoint network. Multipoint networks can include, but not be limited to, wireless Internet and IP telephony networks, for example, using gigahertz radio frequencies. This channel may provide unicast, multicast, or broadcast communication service. Further, some functions performed by the MAC layer can include frame delimiting and recognition, addressing of destination network nodes (both as individual nodes and as groups of nodes), conveying of addressing information, protecting against errors, for example, by generating and/or checking frame check sequences, and controlling access to the physical transmission medium. The MAC layer can be implemented by numerous devices, including, but not limited to, a cable modem termination system (CMTS), an optical line termination (OLT), or a wireless access point (WAP), and the like. In various embodiments, layer-2 devices (for example, the MAC layer devices) can perform mapping operations. For example, the layer-2 devices (for example, the MAC layer devices) can associate a service flow identifier to a data group and/or a service group, for example, as a part of a bonding group. In some implementations, the functionality of layer-2 described above may be performed by one or more management computing entity 500, as shown in FIG. 5.

In some examples, the functionality of one or more layers (for example, layer-1 and layer 2, as well as any other layers) may be combined. In some embodiments described herein, the functionality of the layer-1 and the functionality of layer-2 may be performed by separate devices, (for example, split MAC/PHY devices). In another embodiment described herein, the functionality of the layer-1 and the functionality of layer-2 may be incorporated into separate devices, to create a fully distributable set of devices. Further, layer-2 functionality (for example, a CMTS and/or an OLT functionality for wireless access point (WAP) functionality) can be provided by a separate module/device. Moreover, layer-1 (the PHY layer) can be provided by a separate module/device.

In some embodiments, the various devices incorporating different layer functionality can be separated geographically. For example, a layer-2 device may be placed at a predetermined distance away from a layer-1 device. In some examples, the distance may be 1 mile, 10 miles, 100 miles and/or the like. The layer-2 device can communicate (for example, serialize and/or send data frames and/or packets) with the layer-1 device. For example, the layer-2 device can use one or more look-up tables, the look-up tables having information including, but not limited to, topology information, bridging information, and/or layer-2 device (for example, MAC 2, Cable Modem 2, and/or wireless device) information (for example, identification information, bandwidth capability information, location information, and the like). In some embodiments, the layer-2 device can perform global service flow classification and/or basic service flow. The layer-2 device may have source address verification (SAV) policing. In various embodiments, the layer-1 device can perform one or more of the classification routines that can be performed in the MAC layer.

It should be noted that although the description above may refer only to layer-1 and/or layer-2 devices, this may only be for exemplification purposes, and any other devices, including functionality of any combination of layers in the OSI stack, may similarly be applicable.

In some embodiments, a network scheduler may be configured to over in connection with the various devices of the remote MAC-based network. For example, the network scheduler may perform scheduling of the data packets at various devices (e.g., at the headend and/or hub devices, the remote MAC devices, and the like) at the outside plant side. Further, the multiple remote PHY devices may receive data packets from a given remote MAC device based on a schedule determined by the network scheduler. For example, a network scheduler may feed multiple (e.g., twenty-four) remote PHY devices out of a single remote MAC device having dedicated MAC computer chip(s) employing MAC functionality. Moreover, because remote MAC devices may have dedicated computer chips with relatively high processing power, a given remote MAC device, in combination with associated remote PHY devices, may be able to provide data to a relatively large number of customers (e.g., approximately twenty thousand customers).

In various aspects, the MAC device 102 and/or the remote PHY device 104 may include aspects of the functionality of the management computing entity 500, as shown and described in connection with FIG. 5 below. In particular, the MAC device 102 and/or the remote PHY device 104 may include or be in communication with one or more processing elements 501, memory 510, volatile memory 511, and may include a communication interface 520 (for example, to communicate with between each other and with various customer premise equipment such as cable modems).

Moreover, the customer premise equipment 120 may include devices that include aspects of the functionality of the user device 610, as further shown and described in connection with FIG. 6, below. For example, customer premise equipment 120 may include a transmitter 608, a receiver 604, and/or a network interface (for example, to communicate with an access point or other device to receive information from the remote PHY device 104 or similar device). Moreover, the customer premise equipment may include volatile memory 622 and/or non-volatile memory 624 in addition to a processor (for example, to perform one or more computational tasks, such as processing received signals, etc.). Further, the customer premise equipment may include a display 616 and/or a keypad 618 (for example, for interacting with a user or operator).

Figure 2:
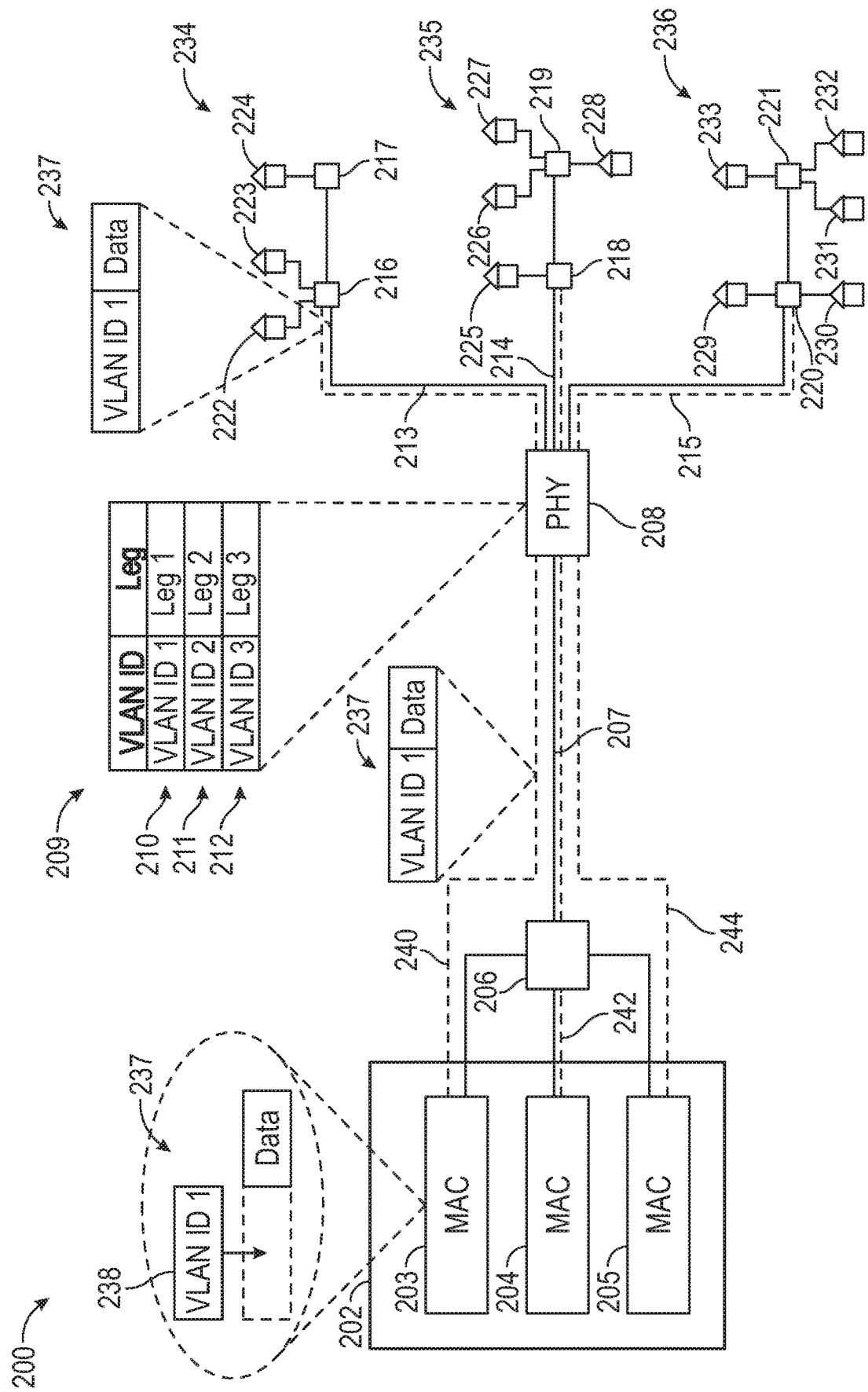
FIG. 2 depicts an example network architecture, in accordance with one or more example embodiments of the disclosure.

FIG. 2 depicts an example network 200 architecture, in accordance with one or more example embodiments of the disclosure. More particularly, FIG. 2 may depict a network 200 including the multi-MAC controller and single PHY system described above. The network 200 may be similar to network 100 and may include some similar elements as network 100. For example, the network 200 may include at least a headend 202 (which may be the same as headend 102), including one or more MAC controllers (for example, MAC controller 203, MAC controller 204, MAC controller 205, and/or any other number of MAC controllers, which may be the same as MAC controller 104) and a PHY device 208 (which may be the same as PHY device 108) including one or more output legs (for example, output leg 213, output leg 214, and/or output leg 215) connected to one or more consumer premises. More particularly, in some cases, the one or more output legs may be connected to one or more CPEs at the consumer premises (which may be the same as the CPEs depicted in network 100). In some cases, the one or more output legs of the PHY device 208 may be connected to the one or more customer premises through one or more taps.

In some embodiments, while the network 200 may include similar elements as the network 100 depicted in FIG. 2, the network 200 may differ from the network 100 in that the network 200 may include multiple MAC controllers (for example, MAC controller 203, MAC controller 204, MAC controller 205, and/or any other number of MAC controllers) transmitting data packets to a single PHY device 208. For example, a single remote PHY device 208 may be associated with multiple MAC controllers (for example, MAC controller 203, MAC controller 204, MAC controller 205, and/or any other number of MAC controllers) at the headend 202 that may provide data packets to the single remote PHY device 208. The multi-MAC controller and single PHY systems may allow for the CPEs associated with the PHY device 208 to be split into multiple distinct scheduling groups (for example, scheduling group 234, scheduling group 235, scheduling group 236, and/or any other number of scheduling groups), with the individual scheduling groups receiving data packets originating from an associated individual MAC controller at the headend. For example, instead of scheduling data packets associated with all of the CPEs associated with a PHY device against one another, the CPEs may be separated into distinct scheduling groups, with each scheduling group being associated with one of the MAC controllers at the headend. With reference to FIG. 2, the scheduling group 234 may be associated with MAC controller 203, the scheduling group 235 may be associated with MAC controller 204, and the scheduling group 236 may be associated with MAC controller 205, for example. The benefits of such a network configuration may include at least a reduction in the complexity of the tasks required to be performed by a scheduler (for example, the MAC controllers or any other device in the network), the use of smaller scheduling groups that may result in less scheduling conflicts as less devices are scheduling data packet transmissions against one another, and a more secure network as smaller groups of CPEs are being exposed to the same downstream data.

In some embodiments, the first MAC controller 203, second MAC controller 204, and third MAC controller 205 may be associated with their own individual logical data streams (which may be referred to as "tunnels" herein) to the PHY device 208. For example, MAC controller 203 may be associated with tunnel 240, MAC controller 204 may be associated with tunnel 242, and MAC controller 205 may be associated with tunnel 244. The individual tunnels may not necessarily refer to physically distinct transmission cables, but may instead refer to separations between data packets based on unique tags included within the data packets (as such, the tunnels may be represented with dashed lines to indicate that they may not necessarily be separate cables). For example, the tunnels may be created using 802.1Q tunneling methods through the use of VLAN tags that may be applied to varying data packets to indicate which "tunnel" the data packets are associated with. In the example depicted in FIG. 2, a first data packet 237 may be provided with a first VLAN ID tag 238 associated with a first tunnel 240 (it should be noted that although the first data packet 237 may only be depicted as including the first VLAN ID tag 238 and data, this may simply be the case for exemplification purposes, and the first data packet 237 may also include any other headers or other types of information). Although not depicted in the figure, a second data packet may also be provided with a second VLAN ID tag, and a third data packet may be provided with a second VLAN ID tag. As mentioned above, the VLAN ID tags may be added to the data packets before they are transmitted to the PHY device 208.

Continuing this example, the first data packet may be associated with the first tunnel 240 based on the first VLAN ID tag, the second data packet may be associated with the second tunnel 242 based on the second VLAN ID tag, and the third data packet may be associated with the third tunnel 244 based on the third VLAN ID tag. It should be noted that the use of VLAN ID tags is just one example of producing distinct data "tunnels" through the network, and any other method may similarly be used. The individual tunnels from the first MAC controller 203, second MAC controller 204, and third MAC controller 205 may respectively serve a first scheduling group 234 including a first set of CPEs (for example, CPE 222, CPE 223, and CPE 224) connected to the remote PHY device 208 a second scheduling group 235 including a second set of CPEs (for example, CPE 225, CPE 226, CPE 227, and CPE 228) connected to the remote PHY device 208, and a third scheduling group 236 third set of CPEs (for example, CPE 229, CPE 230, CPE 231, CPE 232, and CPE 233) connected to the remote PHY device 208. For example, instead of the network including one MAC controller with one tunnel feeding the PHY device 208, and the PHY device 208 feeding a single scheduling group including all of the CPEs in communication with the PHY device 208, the network 200 described herein may be capable of separating the CPEs into multiple scheduling groups (for example, scheduling group 234, scheduling group 235, scheduling group 236) by using multiple MAC controllers with multiple tunnels to feed subsets of the CPEs in communication with the remote PHY device 208. As one example presented in FIG. 2, if a PHY device 208 is serving 12 CPEs, with a single MAC controller, all 12 CPEs may be scheduling packet transmissions against one another. However, with multiple MAC controllers using multiple tunnels to feed two scheduling groups, including 3-5 CPEs each, only 3-5 CPEs may be scheduling packet transmissions against one another instead of 12 CPEs, all scheduling data packet transmissions at the same time.

In some embodiments, the scheduling performed by the MAC controllers in maintaining separate data transfer tunnels may be performed using virtual local area networks (VLANs). A VLAN may include a grouping of one or more devices that may be configured to communicate as if they were located on the same physical local area network (LAN), when they may in fact, be located on any number of LANs in distinct geographic locations. For example, VLANs may be groupings of devices that may not necessarily be grouped together in a single geographical location. Each VLAN may provide data link access to all hosts connected to switch ports configured with the same VLAN ID. The VLAN tag may be a 12-bit field in the Ethernet header that may provide support for over 4,000 VLANs per switching domain. VLAN tagging is standardized in IEEE (Institute of Electrical and Electronics Engineers) 802.1Q and may be referred to as Dot1Q. This VLAN tagging may be performed by the one or more MAC devices in order to separate traffic associated with different MAC controllers. For example, a MAC controller may receive an untagged packet that is to be transmitted to the remote PHY device. Before sending the packet to the remote PHY device, the MAC controller may add a VLAN ID tag to the header of the packet using the 802.1Q format. The packet, including the VLAN ID tag, may then be transmitted to the remote PHY device. It should be noted that while VLANs may be consistently described herein as being used to separate traffic from individual MAC controllers, any other methods may similarly be employed, such as, for example, virtual private networks (VPNs), multiprotocol label switching (MPLS), and/or label-switched paths (LSPs), among other methods.

In some embodiments, the remote PHY 208 device may receive the transmitted packet through an individual tunnel associated with a given MAC controller (for example, the remote PHY device 208 may receive a first data packet through the first tunnel 240 associated with the first MAC controller 203, and so on). The remote PHY device 208 may then extract the information included within the header of the packet to identify the VLAN ID tag added to the packet by the MAC controller. Based on this VLAN ID, the remote PHY device 208 may be able to determine an associated output leg (for example, output leg 213, output leg 214, and/or output leg 215, as well as any other number of output legs) on which to transmit the data packet. That is, the PHY device 208 may be able to determine which scheduling group of CPEs that should receive the data packet from the PHY device 208. The data packet may then be provided to an associated tap device (for example, tap device 216, tap device 217, tap device 218, tap device 219, tap device 220, tap device 221, and/or any other tap device on the network 200) on the appropriate output leg, and then may be sent from the tap device to the appropriate CPE at a customer's premises. In this regard, the discrete traffic tunnels associated with individual MAC controllers and their associated scheduling groups may be maintained through the PHY device 208 and beyond into the individual scheduling groups because the PHY device 208 may route the data packets to their corresponding scheduling groups using the VLAN ID tag added by the MAC controller. In this regard, a first data packet sent by the first MAC controller 203 may continue through the first tunnel 240 through its entire downstream journey to a first example CPE 222 for which it is intended, a second data packet sent by the second MAC controller 204 may continue through a second tunnel 242 through its entire downstream journey to a second example CPE 225 for which it is intended, and a third data packet send by the third MAC controller 205 may continue through a second tunnel 244 through its entire downstream journey to a second example CPE 229 for which it is intended. Thus, as described above, in some cases, the data packet information for the first example CPE 222 may not be visible to the second and third example CPEs, and vice versa, which may provide enhanced security to packet transmissions along the network. Additionally, as mentioned above, the first data packet and second data packet may be scheduled individually the first MAC controller, first CPE, second MAC controller, second CPE, third MAC controller, and third CPE may not need to compete for resources and attempt to schedule the first data packet and second data packet against one another along a single tunnel through the network.

In some cases, the PHY device 208 may determine which output leg to provide a data packet to using a look-up table 209. The look-up table 209 may be a table that includes a listing of VLAN ID tags and the legs of the PHY device that different VLAN ID tags are associated with. For example, the look-up table 209 may indicate that a first VLAN ID tag (for example, VLAN ID tag 1) is associated with a first leg (for example, leg 213), and a second VLAN ID tag (for example, VLAN ID tag 2) is associated with a second leg (for example, leg 214), and a third VLAN ID tag (for example, VLAN ID tag 3) is associated with a third leg (for example, leg 215). Using this information, the PHY device 208 may then be able to determine which leg to transmit the data packet on based on the particular VLAN ID tag added to the data packet header by the MAC controller. In other words, the look-up table may allow the PHY device 208 to determine which "tunnel" a data packet is being transmitted over to maintain the tunnel through the PHY device 208 and all the way to the CPE at the customer's premises. Continuing the above example, the PHY device 208 may receive the first data packet 237 from the first MAC controller 203. The PHY device 208 may then extract the first VLAN ID tag 238 from the first data packet 237 and determine that the VLAN ID tag 238 is VLAN ID 1. The PHY device 208 may then access the look-up table 209 and determine that the VLAN ID 1 is associated with output leg 213 of the PHY device 208. The PHY device may then transmit the first data packet 237 along the first leg 213 to the first scheduling group 234 and a particular CPE associated with the first scheduling group 234. The look-up table 209 may be stored locally to the PHY device 208, or may be stored remotely from the PHY device 208, and the PHY device 208 may either directly access the look-up table 209 at the remote location, or may request information on the look-up table 209 from the remote location.

Illustrative Methods

Figure 3:
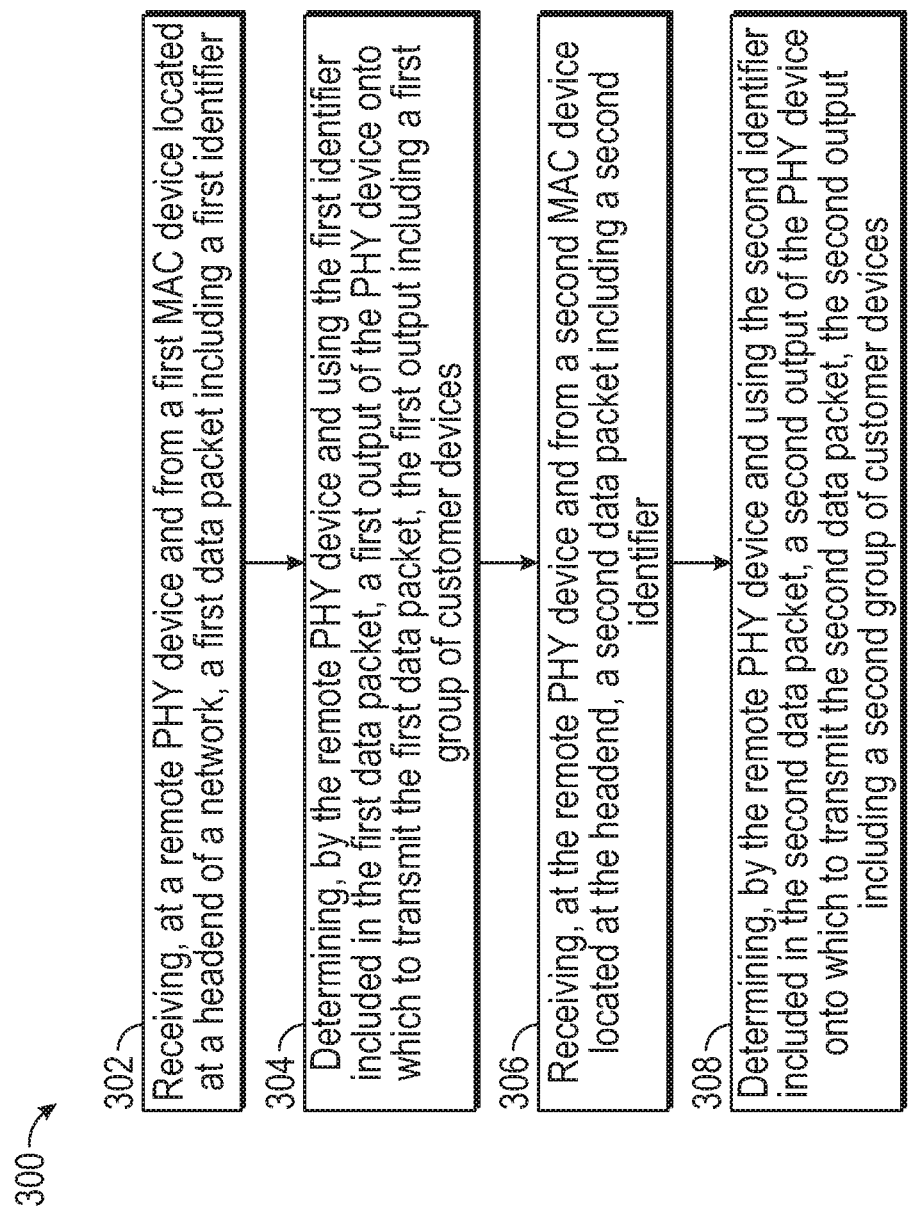
FIG. 3 depicts a flowchart of an example method, in accordance with one or more example embodiments of the disclosure.

FIG. 3 is an example method 300 in accordance with one or more example embodiments of the disclosure. At block 302 of the method 300 in FIG. 3, the method may include receiving, at a remote PHY device and from a first MAC device located at a headend of a network, a first data packet, including a first identifier. The first MAC device may be a MAC controller and may be one of one or more MAC controllers (for example, a first MAC controller, a second MAC controller, and a third MAC controller) that is in communication with the remote PHY device. In some embodiments, the first MAC controller, second MAC controller, and third MAC controller may be associated with their own individual logical data streams (which may be referred to as "tunnels" herein) to the PHY device. For example, the first MAC controller may be associated with a first tunnel, the second MAC controller may be associated with a second tunnel, and the third MAC controller may be associated with a third tunnel. The individual tunnels may not necessarily refer to physically distinct transmission cables, but may instead refer to separations between data packets based on unique tags included within the data packets (as such, the tunnels may be represented with dashed lines to indicate that they may not necessarily be separate cables). For example, the tunnels may be created using 802.1Q tunneling methods through the use of VLAN tags that may be applied to varying data packets to indicate which "tunnel" the data packets are associated with. A first data packet may be provided with a first VLAN ID tag associated with a first tunnel, a second data packet may also be provided with a second VLAN ID tag, and a third data packet may be provided with a second VLAN ID tag. As mentioned above, the VLAN ID tags may be added to the data packets before they are transmitted to the PHY device.

Continuing this example, the first data packet may be associated with the first tunnel based on the first VLAN ID tag, the second data packet may be associated with the second tunnel based on the second VLAN ID tag, and the third data packet may be associated with the third tunnel based on the third VLAN ID tag. It should be noted that the use of VLAN ID tags is just one example of producing distinct data "tunnels" through the network, and any other method may similarly be used. The individual tunnels from the first MAC controller, second MAC controller, and third MAC controller may respectively serve a first scheduling group including a first set of CPEs connected to the remote PHY device, a second scheduling group including a second set of CPEs connected to the remote PHY device, and a third scheduling group third set of CPEs connected to the remote PHY device. For example, instead of the network including one MAC controller with one tunnel feeding the PHY device, and the PHY device feeding a single scheduling group including all of the CPEs in communication with the PHY device, the network described herein may be capable of separating the CPEs into multiple scheduling groups by using multiple MAC controllers with multiple tunnels to feed subsets of the CPEs in communication with the remote PHY device.

Block 304 of the method 300 may include determining, by the remote PHY device and using the first identifier included in the first data packet, a first output of the PHY device onto which to transmit the first data packet, the first output including a first group of customer devices. In some embodiments, the remote PHY device may receive the transmitted packet through an individual tunnel associated with a given MAC controller. The remote PHY device may then extract the information included within the header of the packet to identify the VLAN ID tag added to the packet by the MAC controller. Based on this VLAN ID, the remote PHY device may be able to determine an associated output leg on which to transmit the packet. That is, the PHY device may be able to determine which scheduling group of CPEs that should receive the data packet from the PHY device. The data packet may then be provided to an associated tap device, and then the appropriate CPE at a customer's premises. In this regard, the discrete traffic tunnels associated with individual MAC controllers and their associated scheduling groups may be maintained through the PHY device and beyond into the individual scheduling groups because the PHY device may route the data packets to their corresponding scheduling groups using the VLAN ID tag added by the MAC controller. In this regard, a data packet sent by a first MAC controller may continue through a first tunnel through its entire downstream journey to a first CPE for which it is intended, and a data packet sent by a second MAC controller may continue through a second tunnel through its entire downstream journey to a second CPE for which it is intended. Thus, as described above, in some cases, the data packet information for the first CPE may not be visible to the second CPE, and vice versa, which may provide enhanced security to packet transmissions along the network. Additionally, as mentioned above, the first data packet and second data packet may be scheduled individually the first MAC controller, first CPE, second MAC controller, and second CPE do not need to compete for resources and attempt to schedule the first data packet and second data packet against one another along a single tunnel through the network.

In some embodiments, the PHY device may determine which output leg to provide a data packet to using a look-up table. The look-up table may be a table that includes a listing of VLAN ID tags and the legs of the PHY device that different VLAN ID tags are associated with. For example, the look-up table may indicate that a first VLAN ID tag is associated with a first leg, and a second VLAN ID tag is associated with a second leg, and a third VLAN ID tag is associated with a third leg. Using this information, the PHY device may then be able to determine which leg to transmit the data packet on based on the particular VLAN ID tag added to the data packet header by the MAC controller. In other words, the look-up table may allow the PHY device to determine which "tunnel" a data packet is being transmitted over to maintain the tunnel through the PHY device and all the way to the CPE at the customer's premises. The look-up table may be stored locally to the PHY device, or may be stored remotely from the PHY device, and the PHY device may either directly access the look-up table at the remote location, or may request information on the look-up table from the remote location.

Block 306 of the method 300 may include receiving, at the remote PHY device and from a second MAC device located at the headend, a second data packet, including a second identifier. Block 308 of the method 300 may include determining, by the remote PHY device and using the second identifier included in the second data packet, a second output of the PHY device onto which to transmit the second data packet, the second output including a second group of customer devices. For example, the second data packet sent by the second MAC controller to the remote PHY device may be sent using a second, distinct network tunnel to a second group of CPEs comprising a second scheduling group. That is, data being transmitted from the first MAC controller to a CPE at a customer's premises may be transmitted exclusively through the first network tunnel and data being transmitted from the second MAC controller to a CPE at a customer's premises may be transmitted exclusively through the second network tunnel.

In some embodiments, determining the first output of the PHY device onto which to transmit the first data packet further comprises using a look-up table, wherein the look-up table includes the first identifier and an associated output of the PHY device associated with the first identifier. In some embodiments, the first data packet is transmitted over a first network tunnel and the second data packet is transmitted over a second network tunnel that is different than the first network tunnel. In some embodiments, the first MAC device and second MAC device are at least one of: virtual MAC controllers or physical MAC devices, and wherein the first MAC device and second MAC device add the first identifier and second identifier to the first data packet and second data packet respectively. In some embodiments, the network is a Data Over Cable Service Interface Specification (DOCSIS) network. In some embodiments, the first identifier and second identifier are virtual local area network (VLAN) identifiers, virtual private network (VPN) identifiers, multi-protocol label switching (MPLS) identifiers, or label-switched path (LSP) identifiers.

In some embodiments, the method may also include transmitting the first data packet through the first output to a first customer premises equipment (CPE) associated with a first scheduling group of CPEs associated with the PHY device, wherein the first data packet is transmitted through the first network tunnel from the first MAC device, through the remote PHY device, and to the first CPE. The method may also include transmitting the second data packet through the second output to a second customer premises equipment (CPE) associated with a second scheduling group of CPEs associated with the PHY device, wherein the second data packet is transmitted through the second network tunnel from the second MAC device, through the remote PHY device, and to the second CPE.

The operations described and depicted in the illustrative process flows of FIG. 3 may be carried out or performed in any suitable order as desired in various example embodiments of the disclosure. The operations described and depicted in the illustrative process flows of FIG. 3 may be carried out or performed by any devices described herein, such as the management computing entity 500 described with respect to FIG. 5, as well as any other device described herein). Additionally, in certain example embodiments, at least a portion of the operations may be carried out in parallel. Furthermore, in certain example embodiments, less, more, or different operations than those depicted in FIG. 3 may be performed.

One or more operations of the process flows of FIG. 3 may have been described above as being performed by a user device, or more specifically, by one or more program modules, applications, or the like executing on a device. It should be appreciated, however, that any of the operations of process flows of FIG. 3 may be performed, at least in part, in a distributed manner by one or more other devices, or more specifically, by one or more program modules, applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the process flow of FIG. 3 may be described in the context of the illustrative vehicle transaction platform, it should be appreciated that such operations may be implemented in connection with numerous other device configurations.

Example System Architecture and Computing Entity

Figure 4:
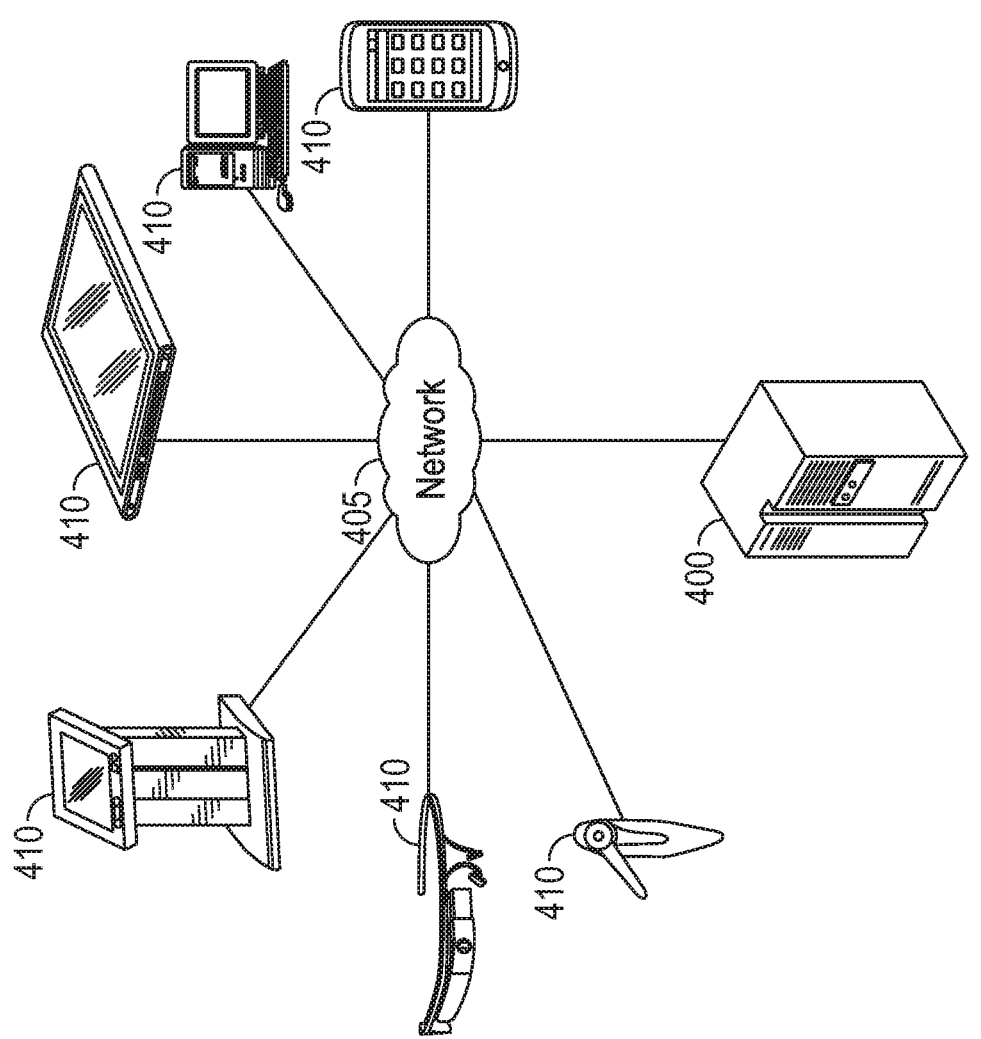
FIG. 4 depicts an example system architecture, in accordance with one or more example embodiments of the disclosure.

FIG. 4 provides an illustration of an example embodiment of the present disclosure. As shown in FIG. 4, this particular embodiment may include one or more management computing entities 400, one or more networks 405, and one or more user devices 410. Each of these components, entities, devices, systems, and similar words used herein interchangeably may be in direct or indirect communication with, for example, one another over the same or different wired or wireless networks. Additionally, while FIG. 4 illustrates the various system entities as separate, standalone entities, the various embodiments are not limited to this particular architecture.

In various aspects, the management computing entities 400 may include various devices on a cable network, including, but not limited to, switches, remote MAC devices, cable modem termination system (CMTS) devices, remote PHY devices, amplifiers, fiber nodes, and the like, to be variously described below. In another aspect, such devices may include circuitry (for example, processors and memory) and associated software instructions (for example, computer code) to perform various functions associated with such devices (for example, transmit packets, receive packets, process packets, sort packets, provide status updates, download and install software updates, etc.).

In another aspect, the networks 405 may include, but not be limited to, cable networks, including hybrid fiber-coaxial cable networks. More broadly, the networks 405 may include at least portions of wireless networks or wired networks. In another aspect, a cable network may use various sub-networks (for example, Wi-Fi networks, cellular networks) to perform aspects of the functionality described herein, for example, in connection with the disclosed devices (for example, switches, remote MAC devices, CMTS devices, remote PHY devices, amplifiers, fiber nodes, and the like).

In another aspect, the user devices 410 may include, but not be limited to, devices associated with a customer premise equipment (for example, one or more devices at a customer's home). Non-limiting examples may include, but not be limited to, one or more computers, computing entities, desktop computers, mobile phones, tablets, phablets, notebooks, laptops, distributed systems, gaming consoles (for example, Xbox, Play Station, Wii), watches, glasses, iBeacons, proximity beacons, key fobs, radio frequency identification (RFID) tags, earpieces, scanners, televisions, dongles, cameras, wristbands, wearable items/devices, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein.

FIG. 5 provides a schematic of a management computing entity 500 according to one embodiment of the present disclosure. As noted above, a management computing entity 500 may include various devices on a cable network, including, but not limited to, switches, remote MAC devices, CMTS devices, remote PHY devices, amplifiers, fiber nodes, and the like, as described above (see for example, FIGS. 1-2 and related discussion).

In general, the terms computing entity, computer, entity, device, system, and/or similar words used herein interchangeably may refer to, for example, one or more computers, computing entities, desktop computers, mobile phones, tablets, phablets, notebooks, laptops, distributed systems, gaming consoles (for example, Xbox, Play Station, Wii), watches, glasses, iBeacons, proximity beacons, key fobs, radio frequency identification (RFID) tags, earpieces, scanners, televisions, dongles, cameras, wristbands, wearable items/devices, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In some embodiments, these functions, operations, and/or processes can be performed on data, content, information, and/or similar terms used herein interchangeably.

As indicated, in some embodiments, the management computing entity 500 may also include one or more communications interfaces 520 for communicating with various computing entities, such as by communicating data, content, information, and/or similar terms used herein interchangeably that can be transmitted, received, operated on, processed, displayed, stored, and/or the like. For instance, the management computing entity 500 may communicate with user devices 110 and/or a variety of other computing entities.

As shown in FIG. 5, in some embodiments, the management computing entity 500 may include or be in communication with one or more processing elements 505 (also referred to as processors, processing circuitry, and/or similar terms used herein interchangeably) that communicate with other elements within the management computing entity 500 via a bus, for example. As will be understood, the processing element 505 may be embodied in a number of different ways. For example, the processing element 505 may be embodied as one or more complex programmable logic devices (CPLDs), microprocessors, multi-core processors, coprocessing entities, application-specific instruction-set processors (ASIPs), microcontrollers, and/or controllers. Further, the processing element 505 may be embodied as one or more other processing devices or circuitry. The term circuitry may refer to an entire hardware embodiment or a combination of hardware and computer program products. Thus, the processing element 505 may be embodied as integrated circuits, application-specific integrated circuits (ASICs), field programmable gate arrays (FPGAs), programmable logic arrays (PLAs), hardware accelerators, other circuitry, and/or the like. As will therefore be understood, the processing element 505 may be configured for a particular use or configured to execute instructions stored in volatile or non-volatile media or otherwise accessible to the processing element 505. As such, whether configured by hardware or computer program products, or by a combination thereof, the processing element 505 may be capable of performing steps or operations according to embodiments of the present disclosure when configured accordingly.

In some embodiments, the management computing entity 500 may further include or be in communication with non-volatile media (also referred to as non-volatile storage, memory, memory storage, memory circuitry and/or similar terms used herein interchangeably). In some embodiments, the non-volatile storage or memory may include one or more non-volatile storage or memory media 510, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In some embodiments, the management computing entity 500 may further include or be in communication with volatile media (also referred to as volatile storage, memory, memory storage, memory circuitry and/or similar terms used herein interchangeably). In some embodiments, the volatile storage or memory may also include one or more volatile storage or memory media 515, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 505. Thus, the databases, database instances, database management systems, data, applications, programs, program modules, scripts, source code, object code, byte code, compiled code, interpreted code, machine code, executable instructions, and/or the like may be used to control certain aspects of the operation of the management computing entity 500 with the assistance of the processing element 505 and operating system.

As indicated, in some embodiments, the management computing entity 500 may also include one or more communications interfaces 520 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the management computing entity 500 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High-Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the management computing entity 500 may include or be in communication with one or more input elements, such as a keyboard input, a mouse input, a touch screen/display input, motion input, movement input, audio input, pointing device input, joystick input, keypad input, and/or the like. The management computing entity 500 may also include or be in communication with one or more output elements (not shown), such as audio output, video output, screen/display output, motion output, movement output, and/or the like.

As will be appreciated, one or more of the management computing entities 100 components may be located remotely from other management computing entity 500 components, such as in a distributed system. Furthermore, one or more of the components may be combined, and additional components performing functions described herein may be included in the management computing entity 100. Thus, the management computing entity 500 can be adapted to accommodate a variety of needs and circumstances. As will be recognized, these architectures and descriptions are provided for example purposes only and are not limiting to the various embodiments.

Figure 6:
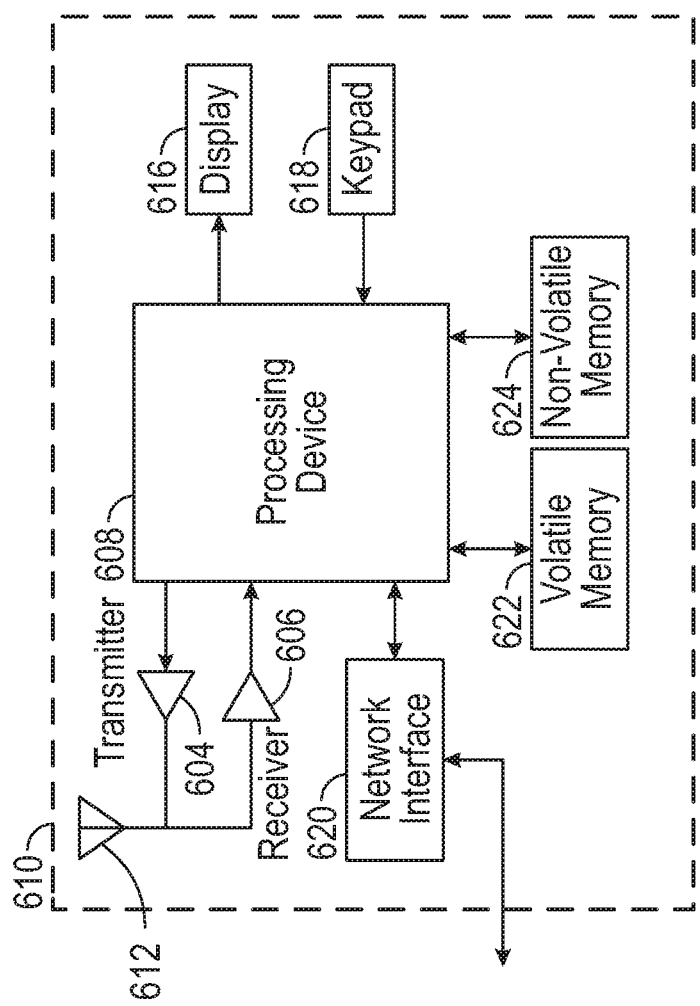
FIG. 6 depicts an example user device, in accordance with one or more example embodiments of the disclosure.

FIG. 6 depicts an example user device 610, in accordance with one or more example embodiments of the disclosure. A user may be an individual, a family, a company, an organization, an entity, a department within an organization, a representative of an organization and/or person, and/or the like. In one example, users may be employees, residents, customers, and/or the like. For instance, a user may operate a user device 610 that includes one or more components that are functionally similar to those of the management computing entity 500 described with respect to FIG. 5 above. In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (for example Xbox, Play Station, Wii), watches, glasses, key fobs, radio frequency identification (RFID) tags, earpieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. User devices 610 can be operated by various parties. As shown in FIG. 6, the user device 610 can include an antenna 612, a transmitter 604 (for example, radio), a receiver 606 (for example, radio), and a processing element 608 (for example CPLDs, microprocessors, multi-core processors, coprocessing entities, ASIPs, microcontrollers, and/or controllers) that provides signals to and receives signals from the transmitter 604 and receiver 606, respectively.

The signals provided to and received from the transmitter 604 and the receiver 606, respectively, may include signaling information in accordance with air interface standards of applicable wireless systems. In this regard, the user device 610 may be capable of operating with one or more air interface standards, communication protocols, modulation types, and access types. More particularly, the user device 610 may operate in accordance with any of a number of wireless communication standards and protocols, such as those described above with regard to the management computing entity 500. In a particular embodiment, the user device 610 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the user device 610 may operate in accordance with multiple wired communication standards and protocols, such as those described above with regard to the management computing entity 500 via a network interface 620.

Via these communication standards and protocols, the user device 610 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The user device 610 can also download changes, add-ons, and updates, for instance, to its firmware, software (for example, including executable instructions, applications, program modules), and operating system.

According to one embodiment, the user device 610 may include location determining aspects, devices, modules, functionalities, and/or similar words used herein interchangeably. For example, the user device 610 may include outdoor positioning aspects, such as a location module adapted to acquire, for example, latitude, longitude, altitude, geocode, course, direction, heading, speed, universal time (UTC), date, and/or various other information/data. In some embodiments, the location module can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information can be determined by triangulating the user device 610 position in connection with a variety of other systems, including cellular towers, Wi-Fi access points, and/or the like. Similarly, the user device 610 may include indoor positioning aspects, such as a location module adapted to acquire, for example, latitude, longitude, altitude, geocode, course, direction, heading, speed, time, date, and/or various other information/data. Some of the indoor systems may use various position or location technologies, including RFID tags, indoor beacons or transmitters, Wi-Fi access points, cellular towers, nearby computing devices (for example, smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The user device 610 may also comprise a user interface (that can include a display 616 coupled to a processing element 608) and/or a user input interface (coupled to a processing element 608). For example, the user interface may be a user application, browser, user interface, and/or similar words used herein interchangeably executing on and/or accessible via the user device 610 to interact with and/or cause display of information from the management computing entity 500, as described herein. The user input interface can comprise any of a number of devices or interfaces allowing the user device 610 to receive data, such as a keypad 618 (hard or soft), a touch display, voice/speech or motion interfaces, or other input devices. In embodiments including a keypad 618, the keypad 618 can include (or cause display of) the conventional numeric (0-9) and related keys (#, *), and other keys used for operating the user device 610 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The user device 610 can also include volatile storage or memory 622 and/or non-volatile storage or memory 624, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the user device 610. As indicated, this may include a user application that is resident on the entity or accessible through a browser or other user interface for communicating with the management computing entity 500 and/or various other computing entities.

In some embodiment, the user device 610 may include one or more components or functionality that are the same or similar to those of the management computing entity 100, as described in greater detail above. As will be recognized, these architectures and descriptions are provided for example purposes only and are not limiting to the various embodiments.

That which is claimed is:

1. A system comprising:
at least one processor; and
at least one memory storing computer-executable instructions, that when executed by the at least one processor, cause the at least one processor to:
receive, at a remote PHY device that is remote from an optical line terminal (OLT) and a headend of a network and from a first MAC device located at the headend of the network, a first data packet including a first identifier;
access, by the remote PHY device, a look-up table;
determine, by the remote PHY device and using the first identifier included in the first data packet and the look-up table, a first output of the PHY device onto which to transmit the first data packet, the first output including a first group of customer devices;
receive, at the remote PHY device and from a second MAC device located at the headend, a second data packet including a second identifier;
determine, by the remote PHY device and using the second identifier included in the second data packet, a second output of the PHY device onto which to transmit the second data packet, the second output including a second group of customer devices;
transmit the first data packet through the first output to a first customer premises equipment (CPE) associated with a first scheduling group of CPEs associated with the PHY device, wherein the first data packet is transmitted through a first network tunnel from the first MAC device, through the remote PHY device, and to the first CPE, wherein the first MAC device transmits data to the first CPE only through the first network tunnel; and
transmit the second data packet through a second output to a second customer premises equipment (CPE) associated with a second scheduling group of CPEs associated with the PHY device, wherein the second data packet is transmitted through a second network tunnel from the second MAC device, through the remote PHY device, and to the second CPE, wherein the second MAC device transmits data to the second CPE only through the second network tunnel.

2. The system of claim 1, wherein the first MAC device and second MAC device are at least one of: virtual MAC controllers or physical MAC devices, and wherein the first MAC device and second MAC device add the first identifier and second identifier to the first data packet and second data packet respectively.

3. The system of claim 1, wherein the network is a Data Over Cable Service Interface Specification (DOCSIS) network.

4. The system of claim 1, wherein the first identifier and second identifier are virtual local area network (VLAN) identifiers, virtual private network (VPN) identifiers, multiprotocol label switching (MPLS) identifiers, or label-switched path (LSP) identifiers.

5. A method, comprising:
receiving, at a remote PHY device that is remote from an optical line terminal (OLT) and a headend of a network and from a first MAC device located at the headend of the network, a first data packet including a first identifier;
access, by the remote PHY device, a look-up table;
determining, by the remote PHY device and using the first identifier included in the first data packet and the look-up table, a first output of the PHY device onto which to transmit the first data packet, the first output including a first group of customer devices;
receiving, at the remote PHY device and from a second MAC device located at the headend, a second data packet including a second identifier;
determining, by the remote PHY device and using the second identifier included in the second data packet, a second output of the PHY device onto which to transmit the second data packet, the second output including a second group of customer devices;
transmitting the first data packet through the first output to a first customer premises equipment (CPE) associated with a first scheduling group of CPEs associated with the PHY device, wherein the first data packet is transmitted through a first network tunnel from the first MAC device, through the remote PHY device, and to the first CPE, wherein the first MAC device transmits data to the first CPE only through the first network tunnel; and
transmitting the second data packet through a second output to a second customer premises equipment (CPE) associated with a second scheduling group of CPEs associated with the PHY device, wherein the second data packet is transmitted through a second network tunnel from the second MAC device, through the remote PHY device, and to the second CPE, wherein the second MAC device transmits data to the second CPE only through the second network tunnel.

6. The method of claim 5, wherein the first MAC device and second MAC device are at least one of: virtual MAC controllers or physical MAC devices, and wherein the first MAC device and second MAC device add the first identifier and second identifier to the first data packet and second data packet respectively.

7. The method of claim 5, wherein the network is a Data Over Cable Service Interface Specification (DOCSIS) network.

8. The method of claim 5, wherein the first identifier and second identifier are virtual local area network (VLAN) identifiers, virtual private network (VPN) identifiers, multiprotocol label switching (MPLS) identifiers, or label-switched path (LSP) identifiers.

9. A non-transitory computer readable medium including computer-executable instructions stored thereon, which when executed by one or more processors of a wireless access point, cause the one or more processors to perform operations of:
receiving, at a remote PHY device that is remote from an optical line terminal (OLT) and a headend of a network and from a first MAC device located at the headend of the network, a first data packet including a first identifier;
access, by the remote PHY device, a look-up table;
determining, by the remote PHY device and using the first identifier included in the first data packet and the look-up table, a first output of the PHY device onto which to transmit the first data packet, the first output including a first group of customer devices;
receiving, at the remote PHY device and from a second MAC device located at the headend, a second data packet including a second identifier;
determining, by the remote PHY device and using the second identifier included in the second data packet, a second output of the PHY device onto which to transmit the second data packet, the second output including a second group of customer devices;

transmitting the first data packet through the first output to a first customer premises equipment (CPE) associated with a first scheduling group of CPEs associated with the PHY device, wherein the first data packet is transmitted through a first network tunnel from the first MAC device, through the remote PHY device, and to the first CPE, wherein the first MAC device transmits data to the first CPE only through the first network tunnel; and transmitting the second data packet through a second output to a second customer premises equipment (CPE) associated with a second scheduling group of CPEs associated with the PHY device, wherein the second data packet is transmitted through a second network tunnel from the second MAC device, through the remote PHY device, and to the second CPE, wherein the second MAC device transmits data to the second CPE only through the second network tunnel.

10. The non-transitory computer readable medium of claim 9, wherein the first MAC device and second MAC device are at least one of: virtual MAC controllers or physical MAC devices, and wherein the first MAC device and second MAC device add the first identifier and second identifier to the first data packet and second data packet respectively.

11. The non-transitory computer readable medium of claim 9, wherein the first identifier and second identifier are virtual local area network (VLAN) identifiers, virtual private network (VPN) identifiers, multiprotocol label switching (MPLS) identifiers, or label-switched path (LSP) identifiers.

* * * * *